United States Patent
Hanes et al.

(10) Patent No.: US 6,905,568 B2
(45) Date of Patent: Jun. 14, 2005

(54) PROCESS FOR MINIMIZING HAZE OF EXTRUDED CLEAR BLENDS CONTAINING STYRENE/BUTADIENE POLYMER AND PRODUCT THEREOF

(75) Inventors: Mark D. Hanes, Bartlesville, OK (US); Lee A. Carvell, Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 10/465,397

(22) Filed: Jun. 19, 2003

(65) Prior Publication Data

US 2003/0215656 A1 Nov. 20, 2003

Related U.S. Application Data

(62) Division of application No. 09/222,663, filed on Dec. 30, 1998, now abandoned.

(51) Int. Cl.[7] .............................................. B29C 47/06
(52) U.S. Cl. ........................... 156/244.27; 264/173.16; 264/173.19
(58) Field of Search ...................... 156/244.11, 244.27; 264/173.16, 173.19; 428/483

(56) References Cited

U.S. PATENT DOCUMENTS

| | | | |
|---|---|---|---|
| 4,323,606 A | 4/1982 | Buck | 428/35 |
| 4,386,190 A | 5/1983 | Bailey | 525/93 |
| 4,409,285 A | 10/1983 | Swerdlow | 428/332 |
| 4,590,241 A * | 5/1986 | Hohlfeld | 525/132 |
| 4,835,041 A | 5/1989 | Tsukamoto et al. | 428/215 |
| 5,084,352 A * | 1/1992 | Percec et al. | 428/412 |
| 5,252,664 A | 10/1993 | Thompson et al. | 525/64 |
| 5,322,664 A | 6/1994 | Blackwelder | 264/565 |
| 5,331,048 A | 7/1994 | Hasselbring | 525/98 |
| 5,336,719 A | 8/1994 | Thompson et al. | 525/71 |
| 5,385,781 A * | 1/1995 | Chundury et al. | 428/330 |
| 5,523,136 A | 6/1996 | Fischer et al. | 428/35.2 |
| 5,972,519 A | 10/1999 | Niessner et al. | 428/474.4 |
| 6,063,867 A * | 5/2000 | Wang et al. | 525/71 |

FOREIGN PATENT DOCUMENTS

WO  WO97/46608  12/1997

* cited by examiner

*Primary Examiner*—Mark Eashoo
(74) *Attorney, Agent, or Firm*—Ken Goodman; Williams, Morgan & Amerson

(57) ABSTRACT

A process for reducing the haze of extrusions of clear polymeric blends containing styrene-butadiene copolymer and a polymer immiscible therewith. An assembly of extrusion layers in which a layer of clear polymeric blends containing styrene/butadiene copolymer and a polymer immiscible therewith is overlayered with layers of clear material that provides a smooth extruded surface.

2 Claims, No Drawings

PROCESS FOR MINIMIZING HAZE OF EXTRUDED CLEAR BLENDS CONTAINING STYRENE/BUTADIENE POLYMER AND PRODUCT THEREOF

This is a divisional of application Ser. No. 09/222,663 filed Dec. 30, 1998, now abandoned.

FIELD OF THE INVENTION

The invention relates to blends of polymers that exhibit surface roughness when sheet-like extrusions are produced. In one of its aspects the invention relates to processes for the extrusion of blends of styrene/butadiene polymers with polymers that are immiscible with the styrene/butadiene polymers. In another of its aspects the invention relates to the production of multi-layered extrusions. In yet another aspect of the invention it relates to providing a smooth overcoating layer to a rough surface of an extruded blend of styrene/butadiene polymers blended with polymers that are immiscible with the styrene/butadiene polymers.

BACKGROUND OF THE INVENTION

Blends of styrene/butadiene copolymers with polymers immiscible therewith often exhibit roughness on the surface of sheet-like extrusions made with the blends. For a blend formulation that would normally produce a transparent product the rough surface results in an increase in the haze of the extruded material. An invention that can remedy the production of a rough surface on extruded sheet-like material can be of real value by allowing the utilization of the extruded blends of immiscible polymers in a full range of uses for which a hazy appearance would be a drawback.

SUMMARY OF THE INVENTION

It is an object of this invention is to provide a process by which the production of a rough surface by extrusion of blended polymers can be remedied.

Another object of this invention is to at least partially decrease the haze for extrudates of blends of butadiene/styrene polymers with polymers that are immiscible with these polymers.

A further object of this invention is to provide a multi-layered extrusion having an internal portion that is a blend of immiscible polymers and surfaces of polymer that on extrusion provides a smooth surface.

The invention is a process for providing a smooth surface for a rough surfaced, polymer blend extrudate thereby allowing utilization of an extrudate of the polymers for uses in which a hazy appearance is unwelcome. The present invention overcomes the production of a rough surface by overcoating what would normally be the surface of the extrusion of the blended material with a layer of extruded material that results in the production of a smoother surface thereby providing an extruded product that has less haze than would be evidenced by the surface of the blended material without the added layer of smoother surfaced polymer.

Other objects and advantages of the invention will become apparent from the detailed description and the appended claims.

DETAILED DESCRIPTION OF THE INVENTION

The polymers of concern in this invention are those that when blended with other polymers provide a blend that can normally produce a transparent product when molded by a process other than extrusion into sheet-like product but which upon extrusion into sheets is subject to be produced with a surfaces sufficiently rough that the haze of the material is increased. For the purposes of this disclosure the term "sheet-like" means any extrusion in a form that has little thickness in relation to its length and width, as in a sheet, profile or film. Among the blends for which this invention is provided, but not limited thereto, are blends of K-Resin, styrene/butadiene block copolymers of 75 weight percent styrene and 25 weight percent butadiene based on the total weight of the block copolymer, which is available from Phillips Petroleum Company, Bartlesville, Okla. (U.S.A.). These styrene/butadiene copolymers when blended with polymers with which they are immiscible, such as styrene/methyl methacrylate copolymers; styrene/acrylonitrile copolymers; copolymers of poly(ethylene terephthalate), particularly amorphous poly(ethylene terephthalate), and styrene/maleic anhydride copolymers produce blends that on injection molding have low haze but when extruded into sheet-like product have haze that is sufficient to be considered a problem. The haze is the result of surface roughness of the extruded blends.

In the process of the present invention a polymer blend, such as a blend of K-Resin with one of the polymers with which is immiscible listed above, is processed by extrusion into a sheet-like core layer while concurrently a polymer that extrudes with a smooth surface is extruded as cap layers onto the surfaces of the core layer so that while the layers of extrudate are still molten they are pressed together, as by passing between rollers, so that the layers are united as they cool, as by passing between cooling rollers, from the molten state to form a single sheet of extrudate having surface roughness that is at least improved as compared to the surfaces of the core layer thereby providing an extrudate with better haze than the core layer would have exhibited.

Although any polymer that produces a smooth surface on extrusion, particularly extrusion as a sheet, and is compatible with the polymers of the core layer can be used as the polymer for the extrusion of the cap layers, the use of one of the polymers that makes up the blend used in the core layer is preferred. Similarly, although the polymers making up the blend can each be used separately on opposite surfaces of the core layer, the use of the same polymer on both surfaces is preferred so that the resulting surface on each side of the final extrudate product can be more nearly the same.

The core layer can be a single layer of extrudate or can be formed from multiple simultaneous extrusions. The art is well aware of techniques for multiple simultaneous extrusions to accommodate both more than one layer being used to form the core layer and the simultaneous extrusion of the cap layers with the core layer or core layers. It is also within the knowledge of the art to control the thickness of the extrusions so that the core layer can be made very thick in comparison to the cap layers thereby taking better advantage of the physical characteristics of the blend.

The following examples are presented to further illustrate this invention and are not to be construed as unduly limiting its scope.

EXAMPLE I

This example illustrates the improvement in haze achieved by providing a layered structure of a core layer of polymer blend sandwiched between two cap layers of polymer that extrudes with a smooth surface as compared to the haze of an uncapped core layer of the same blended material.

A styrene/butadiene block copolymer designated KRO3, commercially available from Phillips Petroleum Company, Bartlesville, Okla. (U.S.A.) was mixed with a styrene/methyl methacrylate copolymer (SMMA) under the name NAS-21, commercially available from Novacor Chemicals, in amounts to provide three blends of 20, 35 and 50 percent by weight SMMA and 80, 65 and 50 percent by weight KRO3, respectively. These blends were subjected to molding in an injection molding machine and were extruded into test sheets. Both the injection molded samples and the extruded test sheets were tested to determine haze. The results of the tests are reported in the tables below.

TABLE I

| | Injection Molding | | |
|---|---|---|---|
| Blend | 1 | 2 | 3 |
| KRO3 % | 80 | 65 | 50 |
| SMMA % | 20 | 35 | 50 |
| Haze | 1.40 | 1.18 | 1.32 |

This table shows the acceptable levels of haze of the three blends tested. The results can be compared with the levels of haze of the extruded samples set out below.

For the purpose of this example set out in Table II below the sheet thickness of the extrudates was held constant at 25 mils. For samples containing cap layers the A thickness was set at one mil and the B thickness was set at 23 mils. In the table the structure of the sample is presented by the letter "A" which indicates the cap layer and the letter "B" which indicates the core layer. The structure is indicated as "B", a single core layer or "A-B-A", a core layer with a cap layer on each side.

TABLE II

| | | Sheet Extrusion | | | | | |
|---|---|---|---|---|---|---|---|
| Structure | | B | A-B-A | A-B-A | B | A-B-A | A-B-A |
| Core B Layer | KRO3 % | 80 | 80 | 80 | 50 | 50 | 50 |
| | SMMA % | 20 | 20 | 20 | 50 | 50 | 50 |
| Cap A Layer | KRO3 % | | 100 | | | 100 | |
| | SMMA % | | | 100 | | | 100 |
| Haze | | 8.18 | 6.24 | 7.62 | 18.3 | 4.62 | 2.46 |

Compare the haze for the injection molded samples above in which the 80 percent KRO3, 20 percent SMMA blend had the highest value, 1.40. The same blend after being extruded into a 25 mil sheet exhibited haze of 8.18. The 50-50 blend jumped from 1.32 for the injected molded sample to 18.3 for the extruded sheet. The improvement of the extruded sample results by addition of the cap layers is striking.

Reasonable variations, modifications and adaptations can be made within the scope of the disclosure and the appended claims without departing from the scope of this invention.

That which is claimed is:

1. A process for reducing the haze of sheet-like extrusions of clear polymeric blends attributable to rough surface of the extrudate comprising:
  (A) coextruding
    (1) a least one core layer of a blend of (a) a first polymer and (b) a second polymer immiscible therewith,
    (2) a first outer layer of a polymer that extrudes with a smooth surface and
    (3) a second outer layer of a polymer that extrudes with a smooth surface and thereafter
  (B) assembling, while the layers are molten, the first outer layer to a first surface of the at least one core layer and the second outer layer to a second surface of the at least one core layer and
  (C) cooling the assembled layers to a temperature below molten temperature,
  wherein the first polymer is a styrene-butadiene copolymer;
  wherein the second polymer is a styrene-methyl methacrylate polymer;
  wherein the core layer comprises at least 20 weight % of the second polymer;
  wherein the first outer layer is a styrene-butadiene copolymer;
  wherein the second outer layer is a styrene-butadiene copolymer; and
  wherein the first outer layer, second outer layer and core layer after assembly have a haze that is at least 23.7% less than the core layer alone.

2. A process for forming an assembly of sheet-like extrusions, comprising:
  forming an extruded core layer comprising a blend of a first polymer and a second polymer immiscible therewith, wherein the extruded core layer comprises a first surface on one side of the extruded core layer and a second surface on the opposite side of the extruded core layer, and wherein the extruded core layer has a level of haze;
  forming a first outer extruded layer that contacts the first surface of the extruded core layer and that comprises at least one polymer that extrudes with a smooth surface;
  forming a second outer extruded layer that contacts the second surface of the extruded core layer and that comprises at least one polymer that extrudes with a smooth surface;
  wherein the first outer extruded layer is assembled to the first surface of the extruded core layer and the second outer extruded layer is assembled to the second surface of the extruded core layer while the layers are molten, and the assembled layers are cooled to a temperature below molten temperature;
  wherein the first polymer is a styrene-butadiene copolymer;
  wherein the second polymer is selected from the group consisting of styrene-methyl methacrylate polymers, styrene-acrylonitrile polymers, copolymers of poly (ethylene terephthalate) and styrene-maleic anhydride copolymers;
  wherein the core layer comprises at least 20 weight % of the second polymer;
  wherein the first outer extruded layer is one of the first polymer or the second polymer;
  wherein the second outer extruded layer is one of the first polymer or the second polymer; and
  wherein a haze of the assembly comprising the extruded core layer, first outer extruded layer, and second outer extruded layer is at least 6.8% less than a haze of the core layer alone.

* * * * *